Sept. 13, 1960 H. Z. GORA 2,952,036
APPARATUS FOR MAKING COMPOSITE ARTICLES
Filed Jan. 4, 1955 4 Sheets-Sheet 2

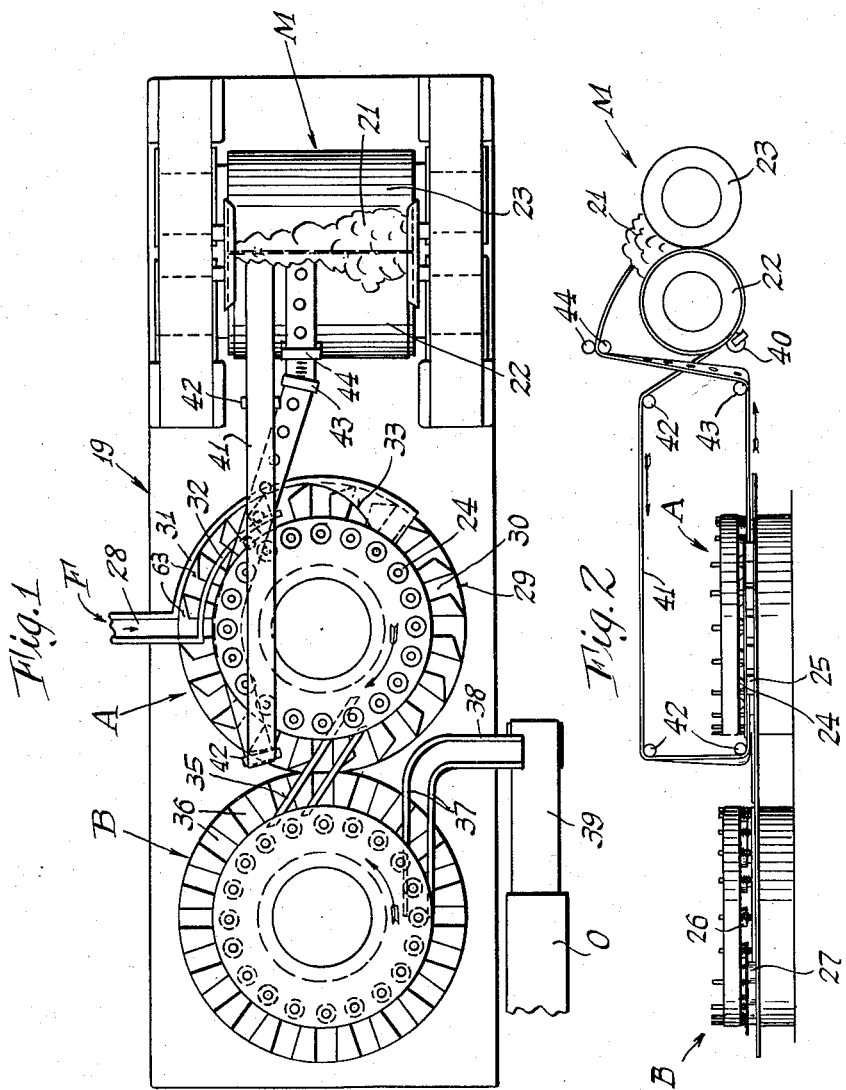

INVENTOR
Henry Z. Gora

BY Johnson and Kline
ATTORNEYS

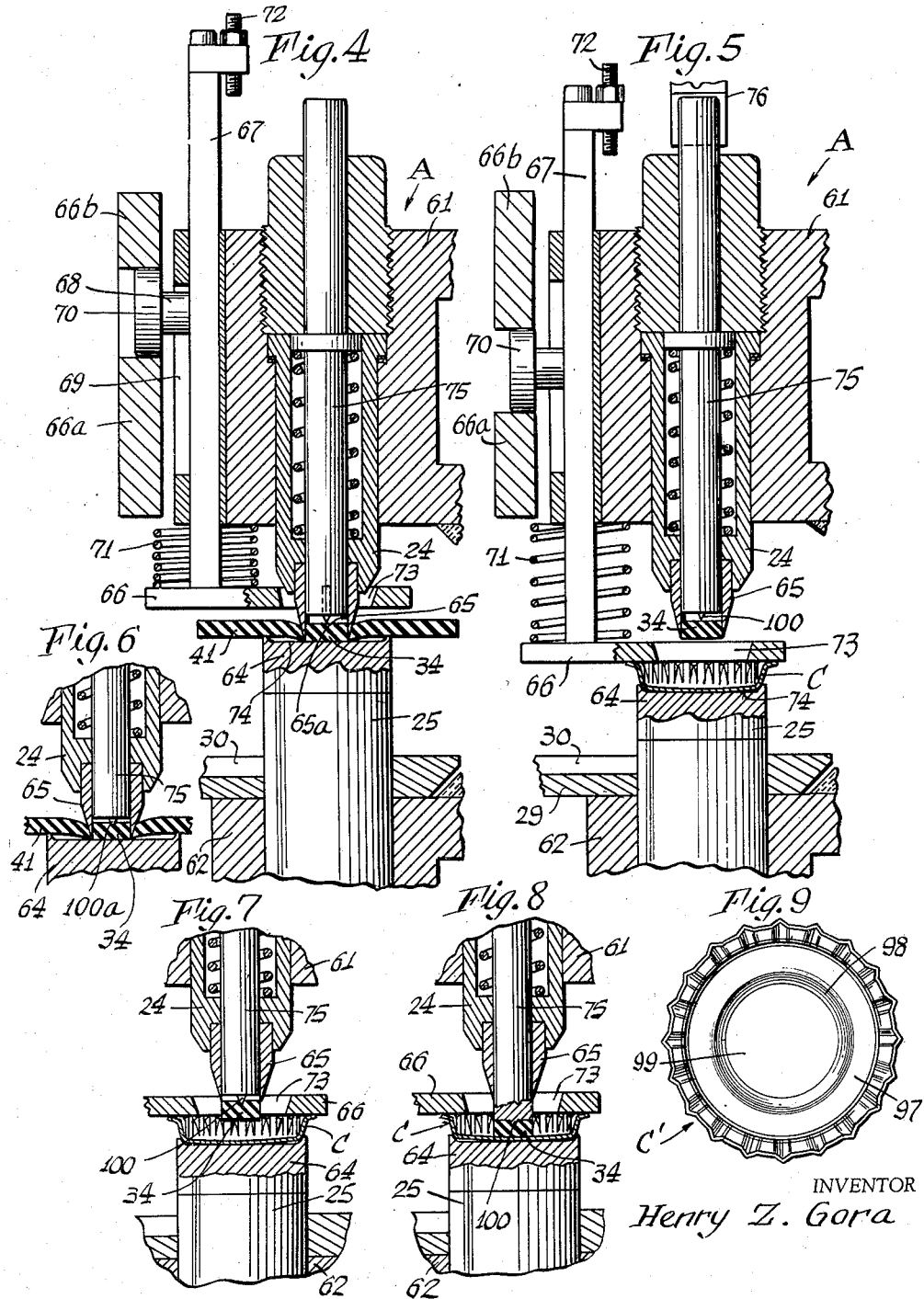

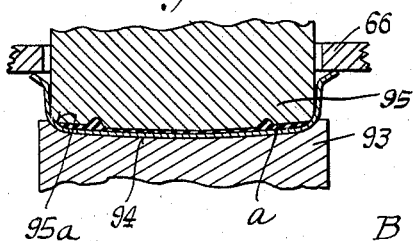
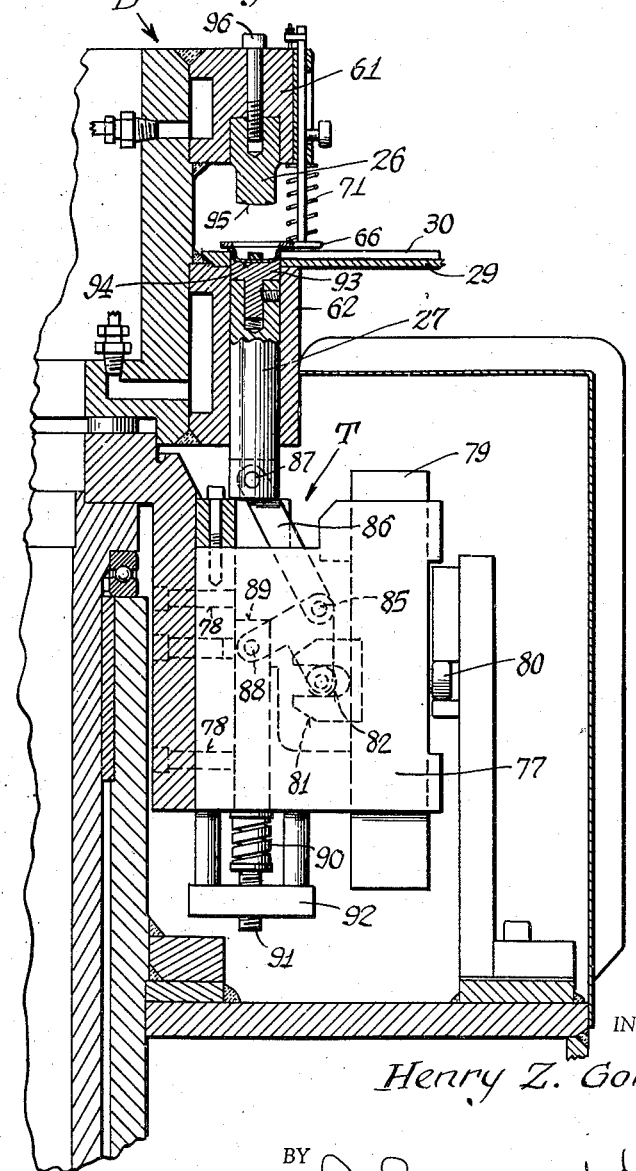

United States Patent Office 2,952,036
Patented Sept. 13, 1960

2,952,036

APPARATUS FOR MAKING COMPOSITE ARTICLES

Henry Z. Gora, Stratford, Conn., assignor, by mesne assignments, to Anchor Hocking Glass Corporation, Lancaster, Ohio, a corporation of Delaware Filed Jan. 4, 1955, Ser. No. 479,833

5 Claims. (Cl. 18—20)

This invention relates to means for producing composite articles, e.g. closures, washers, gaskets, diaphragms and the like, including a base member and a molded member of determinate volume, size and shape, and position on the base member, which molded element is adhesively attached or bonded to said base member. More particularly, this invention relates to the making of a container closure having a flange and a resilient gasket of elastomeric material molded therein within the flange.

In the form of the invention herein disclosed, to produce a composite article there are employed a blanking die member and a molding die member. The blanking die member is hollow for removing from a piece of moldable material a slug of determinate volume and retaining it therein. An ejector slidably mounted in the blanking die member transfers the slug to a base member placed beneath it and preferably presses the slug into adhesive engagement therewith.

After a slug of moldable material is transferred to the base member, a molding die is brought against the slug under pressure to mold the moldable member to shape and size. As this occurs, the molding material flows laterally to fill the cavity formed by the base member and the molding die member, as the cut-off surface of the latter finally closes on the base member. If the slug is improperly positioned on the base member, the lateral flow of the material of the slug may be excessive in one direction or another depending upon its position on the base member and as a result some of the molding material may be positioned beyond the cut-off surface of the molding die member when the latter finally closes on the base member with the result that the cavity is not completely filled and the molded member is malformed.

Where the slug is formed by a blanking die and then is transferred by an ejector plunger to the base member, there is the ever present danger of the shifting of the slug relative to the ejector as it leaves the blanking die and travels across the space to the base member, with the result that the slug may not be predeterminately positioned on the base member. This difficulty is particularly aggravated with increase of the distance which the slug must travel from the blanking die to the base member, for instance, when the base member includes an upstanding flange, as in the base of a flanged bottle cap.

Another contributing factor to the difficulty is that vibration or other movement of the dies and/or the base member incidental to operation of high speed molding equipment may cause the slug to shift relative to the ejector as it advances toward the base member.

An important feature of this invention is the provision of means for insuring positive control of the slug of moldable material as it is being transferred from the blanking die to the base member so that the slug will be properly positioned thereon for the molding operation to insure the complete filling out of the cavity of the molding die and the proper positioning and formation of the molded member on the base of the composite article.

This is accomplished by the present invention by causing the slug to be held on the ejector plunger against shifting laterally as it travels to and engages the base member and this is done in such a way as to permit the ejector to release the slug when the latter becomes adhesively attached to the base member to remain there as the ejector plunger is retracted. In the form of the invention shown this is done by providing on the end of the ejector plunger an impaling device such as a prick pin which penetrates the slug and releasably holds the slug on the end of the ejector plunger and impales it against lateral movement as it travels out of the blanking die and onto the base member. The prick pin is formed so as to retain the slug with only sufficient tenacity to keep it from shifting on the plunger but insufficient to cause it to remain with the plunger as the latter retracts after the slug has become adhesively attached to the base member.

The present invention is particularly advantageous in connection with the continuous manufacture of composite bottle caps and other composite articles by methods and apparatus such as disclosed in my copending application Serial Number 386,453 filed October 16, 1953, where the blanking and molding dies are arranged in a rotating annular series, and the dies reciprocate as well as travel in circular paths at high speeds.

Although the method steps hereinafter described for carrying out my invention may be entirely manually or semi-automatically carried out, they may be performed automatically by the apparatus herein disclosed.

Other features and advantages will hereinafter appear.

In the accompanying drawings:

Figure 1 is a diagrammatic plan view showing one form of apparatus to which the present invention may be applied.

Fig. 2 is a similar view looking at the apparatus from the side.

Fig. 4 is a similar view showing the cooperating dies on an enlarged scale.

Fig. 5 is a view similar to Fig. 4, but showing the blanking die with the slug therein and with the cap in position thereunder ready to receive the slug from the blanking die.

Fig. 6 is a fragmentary view of some of the parts shown in Fig. 4, but showing a form of the invention in which the impaling pin penetrates the slug during the blanking operation.

Fig. 7 is a fragmentary view of some of the parts shown in Fig. 5, but showing the slug impaled on the prick pin leaving the blanking die.

Fig. 8 is a view similar to Fig. 7, but showing the ejector plunger in position pressing the slug on the surface of the cap.

Fig. 9 is a plan view of the underside of a crown cap having a liner molded thereon.

Fig. 10 is a view similar to Fig. 3, but showing the molding dies with a slug-carrying cap in position to be moved against the molding die.

Fig. 11 is a fragmentary detail view of the molding dies showing the dies in closed position.

Figure 3:
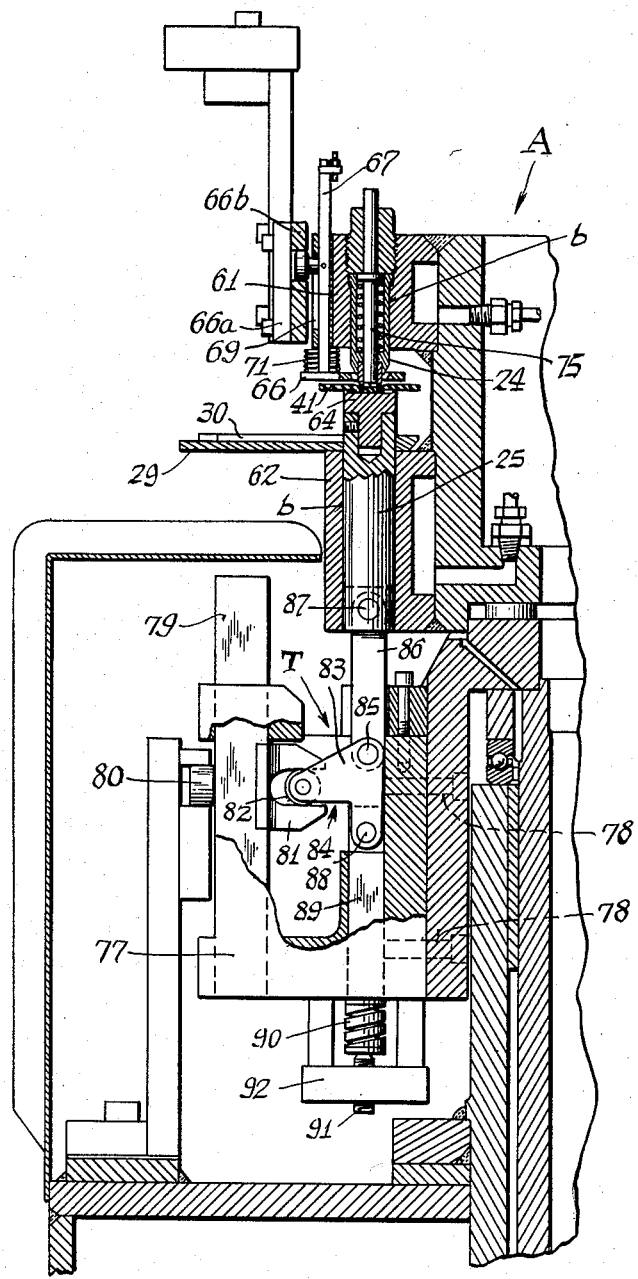
Fig. 3 is a view partly in section and partly in elevation showing the blanking drum, the blanking dies, and toggle mechanism for operating the same, the parts being shown in the positions which they occupy when the dies are closed.

As stated above, the present invention is particularly advantageous when used in connection with high speed apparatus for continuously making composite articles including an elastomeric member, such as molding a resilient liner in situ on a bottle cap. Such apparatus is disclosed in my copending application Serial No. 386,453, filed October 16, 1953, which comprises, as illustrated in Figs. 1 and 2, in addition to a suitable frame or supporting structure 19, a warming mill M having mill rollers 22 and 23, a blanking drum A carrying a circular series of axially aligned blanking die members 24 and 25 which may be opened and closed automatically as the drum rotates, and a drum B carrying a circular series of axially aligned molding die members 26 and 27 which also are opened and closed automatically as the drum rotates. The apparatus also includes a cap feed device F including a chute 28 from which the caps C are deposited one at a time, inner side up, on a plate 29 in radial grooves 30 on the drum A with which the caps travel under the control of guides 31 and 32 until they are moved by a cam 33 into the space between the open cooperating die members 24 and 25 to receive a slug 34 of material from which the gasket is to be molded. The slug-carrying caps C continue traveling with the drum A until they are engaged by a cam 35 which causes them to move radially outwardly along the grooves 30 and be transferred to grooves 36 in the plate 29 of the drum B and between the cooperating die members 26 and 27 which are brought together and held under pressure to mold the slug and form the gasket thereon, as the drum B rotates. When caps C' with the molded gaskets reach the discharge station they are engaged by a cam 37 which moves them outwardly along their grooves 36 onto a chute 38 from which they may be collected for further treatment under temperature controlled conditions if required. When the gasket material is of a type requiring vulcanization, the caps C' may drop from the chute 38 onto a conveyer 39 and on the latter pass through a curing oven O.

From a bank of material 21 between the mill rollers 22 and 23, a layer of moldable gasket material is built on the roller 22 and from this layer there is cut by knives 40 a continuous strip 41 of warmed gasket material which is slightly wider than necessary to form the slug 34 and of the desired thickness. The strip 41 is guided away from the mill horizontally, over guide rollers 42, then downwardly, and then in a reverse direction horizontally so that it enters in the space between cooperating blanking die members 24 and 25 which close upon the strip and remove therefrom the slug 34 having an amount of molding material sufficient to form the gasket. The strip 41 follows the path of the die members 24 and 25 because several members 24—25 are in simultaneous engagement with it and cause it to travel with the dies and drum A for a short distance. As will be explained in more detail below, when the die members 24 and 25 open, the slug 34 is retained by the die member 24 and the strip is allowed to pass from between the die members and be guided by a roller 43 and feed rollers 44 back to the mill M to commingle with the bank 21 thereon and be reused to form the strip. After the strip is removed from between the die members 24 and 25, the naked caps which are carried by the plate 29 are moved successively as they pass a given point into the space between the die members 24 and 25 by the cam 33 and the slug 34 is then transferred from the die member 24 to the inner surface of the cap C. The slug adheres to the cap due to the tackiness of the material and remains so attached while the cap is transferred to the molding die members 26 and 27.

Preferably the mill operates continuously and the drums A and B continuously rotate, thus producing a continuous succession of caps on the underside of each of which is molded a gasket, the parts being driven by an electric or other type of motor.

The blanking drum A and the molding drum B are for the most part alike. Each has an upper flange 61 and a lower flange 62 secured to it, and these flanges have aligned bores b arcuately spaced around them (see Figs. 1 and 10). The lower flanges 62 carry the cap-guiding tables 29 which, as stated above, have cap-guiding grooves 30. The cap-guiding grooves 30 on the drum A have enlarged entrance portions 63 so that the caps can enter the grooves 30 from the relatively stationary chute 28 while the drum A is rotating.

In the form of the invention herein disclosed, the die members 25 and 27, as shown in Figs. 4 and 10, are movably mounted in the flanges 62, while the die members 24 and 26 are held in the flanges 61 against axial movement. Each die member 25 is in the form of a plunger and has mounted on its end a die head 64, and each die member 24 carries a hollow blanking head 65 located above the die head 64, so that when the latter is raised while the strip 41 of moldable material is above it, it will carry the strip against the blanking head 65 and cause a slug 34 of the material to be removed from the strip 41. When the die member 25 descends, the slug 34 is retained in the hollow blanking die 65 as shown in Fig. 5 and this slug is, as explained above, later transferred to a cap.

Associated with each of the die members 24 and 26 is a presser plate 66 mounted on a rod 67 slidably mounted on the upper flange of the drum. The rod 67 has a pin 68 connected therewith, extending through a slot 69 and having at its end a roller 70. The presser plate is provided with a spring 71 which urges it downwardly to a position controlled by an adjustment screw 72. Before the blanking die 64 rises, its associated presser plate has been raised by engagement with a cam 66a to a position above the end of the blanking die 65, the presser plate 66 having an aperture 73 through which the blanking die extends. When the die member 25 descends to free the strip 41, the presser plate 66 operated by a cam 66b pushes the strip 41 off the die 65 to release the strip therefrom. The spring 71 may be made sufficiently strong to cause this downward movement of the presser plate but, for more positive action, the operation is preferably performed by the cam 66b which engages the roller 70.

The die head 64 is provided with a cavity 74 at its upper end which slidably receives and fits the cap when the cap is slid by the cam 33 along the groove 30, the top of the die head 64 being substantially flush with the upper surface of the table 29 in its depressed position at the time that the cap is moved onto and nested in the die head.

The die member 24 has a spring-returned ejector pin 75 which projects above the flange 61 and is operated by a cam 76, Fig. 5, at the proper time and location to force the slug 34 from the hollow blanking head 65. This occurs at a time when the naked cap is raised by the die 64 to bring it into position to receive the slug, as shown in Fig. 5.

The die members 25 and 27 are each moved to die-opening and closing positions by a toggle mechanism T illustrated in Figs. 3 and 10. There is one such toggle mechanism for each of the movable die members and they are secured to their respective drums so as to project radially therefrom. As shown in Figs. 3 and 10, the toggle mechanism comprises a frame 77 secured to the drum by screws 78. Guided within the frame there is a slide bar 79 carrying a roller 80 which is engaged by various cams controlling the movements of the die members. Secured to the slide bar is an operating fork 81 which engages a roller 82 on an arm 83 of a toggle link 84 and forming with the latter a bell crank. The link 84 has a pivot pin 85 connecting it with one end of a companion toggle link 86 whose other end is connected by a wrist pin 87 to the die member 25. The other end of the toggle link 84 is connected by a pin 88 to an abutment bar 89 mounted in the frame 77.

When the dies are fully opened, the members 25 and 27 are in the position exemplified by Fig. 10 in which the toggle is collapsed, the pin 85 being out of line with the pins 87 and 88. When, however, the dies are to be closed, the fork 81 moves the bell crank, of which the toggle link 84 is a part, upwardly causing the toggle links 84 and 86 to be extended, and this results in moving the die members upwardly to perform their operations. The cams operating the slide bars 79 may be so arranged as to bring the pivot pins 85, 87 and 88 into line and slightly beyond, as shown in Fig. 3, and thus lock the toggle against closing until the bell crank is moved in the opposite direction to unlock the toggle. Thus, in the case of the molding die members 27, once the toggles are locked with a slug-carrying cap between the dies there is no need of continuing the engagement between the roller 80 and the cam until such time as the dies are to be opened, and the friction and work which would otherwise be involved in keeping the dies closed under pressure is avoided.

To obtain controllable pressure and follow-up pressure the material between the die members, which are important considerations particularly in the operation of molding a gasket on the cap, the abutment 89 carrying the pivot pin 88 is slidably mounted in the toggle frame 77 and has its end in engagement with a spring 90, the other end of which is engaged by a screw 91 carried by a bracket 92 suspended from the toggle frame 77. Should the upward movement of the die member 25 or 27 meet with abnormal resistance, the abutment bar 89 may yield and compress the spring 90. When the resistance ceases, the spring 90 will move the abutment 89 upwardly and this will carry toggle links 84 and 86 and the connected die member upwardly against the material between it and the relatively stationary member. This upward movement of the toggle links 84 and 86 is not interfered with by the fork 81 because the movements are so slight that they may be compensated for by the slight rocking of the bell crank of which the link 84 is a part. The pressure exerted by the spring 90 may be varied by adjusting the screw 91.

The parts may be so adjusted and arranged that when the die members are brought to their intended closed positions, the abutment 89 normally yields slightly, thereby maintaining the dies closed under pressure determined by the adjustment of the spring 90.

In addition to controlling the pressure between the dies, the abutment 89, because of its yielding action, also prevents damage being done to the parts should a cap become improperly seated on the movable die or should a foreign element inadvertently become lodged between the dies.

Referring to the molding die members 26 and 27 in Fig. 10, the movable member 27 is in the form of a plunger and carries on its end a die 93 having a cavity 94 to slidably receive and nest a slug-carrying cap, while the die member 26 carries a molding die 95 held in place by a screw 96. The end of the die 95 is shaped to form a gasket of desired contour, for instance that shown in Fig. 9, which has an annular ring 97, a sealing ridge 98 and a central diaphragm-like cap-covering portion 99.

When the slug-carrying cap is placed on the die 93, the die member 27 is raised by a suitable cam to lock the toggle T and hold the cap and gasket material under pressure. During this movement of the die 93, the presser plate 66, by the action of its spring 71, holds the cap securely in position on the die 93. After the molding operation has been completed, the die 93 descends and the presser plate pushes the gasketed cap C' off the die 95 and returns it to the approximate level of the plate 29 so that the cap C' can be moved radially off the plate 29 by the cam 37.

The slug 34 is of such thickness and diameter as to have a volume substantially equal to the volume of the molded member, the liner in the example given above, so that when the molding die 95 engages it, the moldable material flows laterally on the cap until cut-off surfaces 95a on the molding die engage the cap, at which time the cavity formed between the molding die and the surface of the cap should be filled.

Due to the distance which the slug must travel in being ejected from the blanking die to the cap, there is the possibility of the slug being placed improperly on the base member, that is to say, being placed eccentrically on the cap in the example given, and this condition is aggravated by the fact that the caps and dies are rotating at considerable speed. The result of this misplacing of the slug 34 on the cap would be that the lateral flow of the molding material under the molding die would not be uniform and some of the material would reach beyond the cut-off surfaces 95a of the molding dies before the latter engage the cap.

To avoid this difficulty as pointed out above, means are provided for maintaining control of the slug 34 in its movement from the blanking die to the cap. In the form of the invention herein illustrated, this is accomplished by providing on the end of the ejector plunger 75 and impaling device in the form of a prick pin 100 which penetrates the slug 34 of molding material and prevents lateral movement thereof relative to the ejector plunger 75. As shown in Figs. 4 and 5, the prick pin 100 is so positioned as not to penetrate the slug as the slug is being formed but only when the slug is being ejected from the blanking die as shown in Fig. 7, the friction between the bore 65a of the blanking die 65 and the slug being sufficient to detain the slug as the impaling pin 100 penetrates it during the operation of the ejector plunger 75. In the embodiment of the invention illustrated in Fig. 6, the impaling pin 100a actually penetrates the blank during the blanking operation.

Whether the embodiment of the invention shown in Figs. 4 and 5 or that shown in Fig. 6 is employed is a matter of choice depending upon the composition of the molding material. In either case, the impaling pin is so tapered as to merely releasably hold the slug in position, whereby after the slug is transferred to the cap as illustrated in Fig. 7 under sufficient pressure to cause the slug to adhere to the cap, the impaling pin 100 or 100a releases the slug and allows the slug to remain on the cap as the ejector plunger 75 is retracted. During the retraction of the ejector plunger 75 the cap is held on the die 64 by the presser plate 66.

By thus insuring that the slug is properly located on the base member C lateral flow (radial flow in the illustrated embodiment of the invention) will be equal in all directions and the molding cavity will be completely filled so that the molded member a, Fig. 11, will have the proper shape and position on the base member C.

Variations and modifications may be made within the scope of the claims and portions of the improvements may be used without others.

I claim:

1. Apparatus for molding a member of predetermined size, shape and volume on a base member, comprising a blanking die for blanking out from a strip of moldable material a slug of predetermined volume, said die being hollow and retaining the slug within it; means for supporting a base member in predetermined position opposite the slug-carrying die and in spaced relation thereto; means for transferring the slug from the blanking die to the base member and adhering the slug thereto, said transferring means including means for penetrating said slug for positively controlling the movement of the slug from the blanking die and across said space to a predetermined interior position on the base member; and means including a molding die for subsequently molding said slug in situ on the base member to the desired size and shape by flowing the moldable material of the slug laterally over the base member to form a liner therefor.

2. The apparatus as defined in claim 1 in which the means for transferring the slug from the blanking die to the base member is an ejector rod mounted within the hollow die, and there are means on the end of the ejector rod which frictionally engages and holds the slug against shifting laterally relative to the ejector rod as the latter moves to carry the slug from the blanking die to the base member.

3. The apparatus as defined in claim 1 in which the means for transferring the slug from the blanking die to the base member is a reciprocating ejector rod mounted within the hollow die, and the means for controlling the movement of the slug is an impaling pin on the end of the ejector rod which penetrates and frictionally engages to hold the slug against shifting laterally relative to the ejector rod as the latter moves to carry the slug from the blanking die to the base member.

4. The apparatus as defined in claim 3 in which means are provided for confining the base member against movement with the ejector rod when the latter recedes leaving the slug adhesively attached to the base member.

5. Apparatus for continuously molding members of predetermined size, shape and volume on a succession of base members, comprising a plurality of blanking dies arranged in a rotatable annular series for blanking out from a strip of moldable material a succession of slugs of predetermined volume, each of said dies being hollow and retaining a slug within it; means rotatable with said series of dies for supporting a succession of base members in predetermined position opposite each slug-carrying die and in spaced relation thereto; means including means associated with each die for transferring the slug from the blanking die to the base member and adhering the slug thereto, said transferring means including means for penetrating said slugs to prevent shifting thereof for positively controlling the movement of the slug from the blanking die across and spaced to a predetermined interior position on the base member; and means including a rotatable annular series of molding dies for subsequently molding said slug in situ on the base member to the desired size and shape by flowing the moldable material of the slug laterally over the base member to form a liner therefor.

References Cited in the file of this patent

UNITED STATES PATENTS

| | | |
|---|---|---|
| 1,486,937 | Taliaferro | Mar. 18, 1924 |
| 2,479,959 | O'Niel | Aug. 23, 1949 |
| 2,548,304 | Gora | Apr. 10, 1951 |
| 2,657,426 | Gora | Nov. 3, 1953 |
| 2,688,776 | Evans et al. | Sept. 14, 1954 |

UNITED STATES PATENT OFFICE
CERTIFICATE OF CORRECTION

Patent No. 2,952,036                  September 13, 1960

Henry Z. Gora

It is hereby certified that error appears in the printed specification of the above numbered patent requiring correction and that the said Letters Patent should read as corrected below.

Column 8, line 10, for "across and spaced" read -- across said space --.

Signed and sealed this 25th day of April 1961.

(SEAL)
Attest:

ERNEST W. SWIDER                          DAVID L. LADD
Attesting Officer                          Commissioner of Patents